United States Patent [19]

Gambino et al.

[11] Patent Number: 5,463,578
[45] Date of Patent: Oct. 31, 1995

[54] MAGNETO-OPTIC MEMORY ALLOWING DIRECT OVERWRITE OF DATA

[75] Inventors: Richard J. Gambino, Stony Brook; Ralph R. Ruf, New City, both of N.Y.

[73] Assignee: International Business Machines Corporation, Armonk, N.Y.

[21] Appl. No.: 310,465

[22] Filed: Sep. 22, 1994

[51] Int. Cl.$^6$ ............................ G11C 13/06; G11B 13/04
[52] U.S. Cl. ........................ 365/122; 369/13; 369/275.2; 360/59
[58] Field of Search .............................. 365/122; 369/13, 369/275.2; 360/59

[56] References Cited

U.S. PATENT DOCUMENTS

| | | | |
|---|---|---|---|
| 4,556,291 | 12/1985 | Chen | 350/377 |
| 4,649,519 | 3/1987 | Sun et al. | 365/122 |
| 4,771,347 | 9/1988 | Horimai et al. | 360/59 |
| 4,794,560 | 12/1988 | Bell et al. | 365/122 |
| 4,871,614 | 10/1989 | Kobayashi | 365/122 X |
| 5,087,532 | 2/1992 | Challener, IV | 428/694 |
| 5,142,513 | 8/1992 | Takehara et al. | 369/13 |
| 5,164,926 | 11/1992 | Matsumoto | 369/13 |
| 5,184,335 | 2/1993 | Kryder et al. | 369/13 |
| 5,187,694 | 2/1993 | Ichihara et al. | 369/13 |
| 5,194,363 | 3/1993 | Yoshioka et al. | 369/275.2 X |
| 5,309,427 | 5/1994 | Matsumoto | 369/13 X |

FOREIGN PATENT DOCUMENTS 0155438  6/1988  Japan ................................. 369/275.2

OTHER PUBLICATIONS

S. A. Nikitin et al., "The Magnetocaloric effect in $Fe_{49}Rh_{51}$ compound", Physics Letters A, vol. 148, No. 6, 7, pp. 363–366, 27 Aug. 1990.

K. B. Vlasov et al., "Giant magnetic after effect of thermal expansion near a first-order magnetic phase transition in alloys based on $Fe_{0.49}Rh_{0.51}$", Sov. Phys. Solid State 31(2), Feb. 1989.

*Primary Examiner*—David C. Nelms
*Assistant Examiner*—Son Dinh
*Attorney, Agent, or Firm*—Robert M. Trepp

[57] ABSTRACT

A magneto-optic memory and storage medium with the ability to directly write or overwrite ones and zeros at recording speed is described incorporating a radiant energy source, a control circuit for adjusting the power of the radiant energy beam and magneto-optic medium having a three layer sandwich comprising a magnetic bias layer, storage layer, and a switching layer therebetween functioning to switch from an antiferromagnetic state at low temperatures to a ferromagnetic state at temperatures above $T_{AF}$. The invention overcomes the problem of direct overwrite of ones and zeros on magneto-optic media.

12 Claims, 4 Drawing Sheets

MAGNETO-OPTIC MEMORY ALLOWING DIRECT OVERWRITE OF DATA

FIELD OF THE INVENTION

This invention relates to magneto-optic memories and more particularly, to magneto-optic media having a multi layer magnetic structure permitting direct overwrite of data.

BACKGROUND OF THE INVENTION

In magneto-optic memories, the magnetic bit is defined by the focus of the laser used to thermomagnetically write the bit, a magnetic domain with its magnetization aligned opposite to that of the surroundings of the magnetic media. The magnetic field used to define the direction of magnetization in the bit can be applied over a large area of the media since it is not used to define the physical area of the bit. This method of writing has a major advantage over conventional magnetic recording in that it does not require flying a magnetic head in close proximity to the medium so magneto-optics provides a high density, removable media. The disadvantage of magneto-optics is that since the magnetic field is applied over a large area, the electromagnet producing the magnetic field has a high inductance and therefore cannot be switched magnetically at high data rates. The inability to switch the magnetic field applied over a large area at high data rates prevents the direct overwrite of data on any given track. It is only possible to write one type of magnetic domain, i.e. all ones, with the magnetic field applied in one direction over a large area of the media. To revise or update magneto-optic data, the track is read and stored in a semiconductor memory, the track is then erased and rewritten with the revised data on the track. After writing, the magneto-optic track is read again to verify that the revised data was written correctly.

In U.S. Pat. No. 5,164,926 which issued on Nov. 17, 1992 to H. Matsumoto, a magneto-optic recording medium with four magnetic layers is described. The recording medium provides an over-write capability by modulating only the intensity of a light beam in accordance with information to be recorded without modulating the direction and strength of a bias field. The magnetic film of four layers consists of a first layer of a perpendicularly magnetizable magnetic thin film, a second layer consisting of a perpendicularly magnetizable magnetic thin film, a switching layer of a perpendicularly magnetizable magnetic thin film, and an initializing layer consisting of a perpendicularly magnetizable magnetic thin film. The first and second layers are exchanged-coupled to each other, the second and fourth layer are exchanged-coupled to each other by way of the third layer at a temperature equal to or lower than a Curie temperature of the third layer.

In U.S. Pat. No. 5,142,513 which issued on Aug. 25, 1992 to H. Takehara et al., a magneto-optic storage medium is described having a first, second and third magnetic layer each of which is composed of an amorphous alloy consisting of a heavy rare-earth metal and a transition metal, an isolation layer composed of a non-magnetic material interposed between the first and second magnetic layers for isolating magnetic exchange interaction between the first and second magnetic layers.

In U.S. Pat. 5,184,335 which issued on Feb. 2nd, 1993 to M. H. Kryder et al., a thin film magneto-optic recording layer such as TbCo or GdTbCo which has a compensation temperature a few tens of degrees centigrade above room temperature. The need for applying an external bias magnetic field to modify previously stored information in a selected region, surrounded by a magnetic domain wall of a thin film magneto-optic media is eliminated. The magneto-optic medium is selected which produces a self-demagnetizing field within a selected region when reheated.

SUMMARY OF THE INVENTION

In accordance with the present invention, a magneto-optic media is described comprising a first bias layer of first magnetic material having high coercivity and a square magnetization loop characteristic to provide an exchange bias field to act at first times on a storage layer, a second switching layer of second magnetic material having an antiferromagnetic state below a critical temperature $T_{AF}$ and a ferromagnetic state above $T_{AF}$ to provide exchange coupling between the bias layer and the storage layer, the second magnetic material having a thermal hysteresis between the antiferromagnetic state and the ferromagnetic state, and a third storage layer of third magnetic material having a square loop magneto-optic characteristic and a Curie temperature less than $T_{AF}$.

The invention further provides a magneto-optic memory for writing data comprising a radiant energy source for generating radiant energy, a lens for focussing the radiant energy on a selected area of a magneto-optic media, the magneto-optic media may be as described above, and means for adjusting the energy delivered by the radiant energy source to raise the temperature of the selected area of the magneto-optic media to a first temperature at first times whereby the storage layer is magnetized in an up direction transverse to the surface of a storage layer and to a second temperature at second times whereby the storage layer is magnetized in a down direction transverse to the surface of the storage layer. The first temperature may be selected to be greater than the $T_c$ of the third storage layer and less than the $T_{AF}$ of the second switching layer. The second temperature may be selected to be greater than the $T_{AF}$ of the second switching layer.

It is an object of the invention to provide a storage media on which it is possible to write a "1" or a "0" at will by laser modulation alone in a fixed external magnetic field.

It is further desirable to provide a magneto-optic memory and magneto optic medium whereby heating a selected area of the medium to a first temperature writes a zero and whereby heating a selected area of the medium to a second temperature greater than the first temperature writes a one. The temperature of the medium may be varied by modulating the laser power or intensity of a radiant energy beam or by controlling the pulse number, duration and spacing.

BRIEF DESCRIPTION OF THE DRAWINGS

These and other features, objects, and advantages of the present invention will become apparent upon consideration of the following detailed description of the invention when read in conjunction with the drawing in which.

DESCRIPTION OF THE PREFERRED EMBODIMENT

Figure 1:
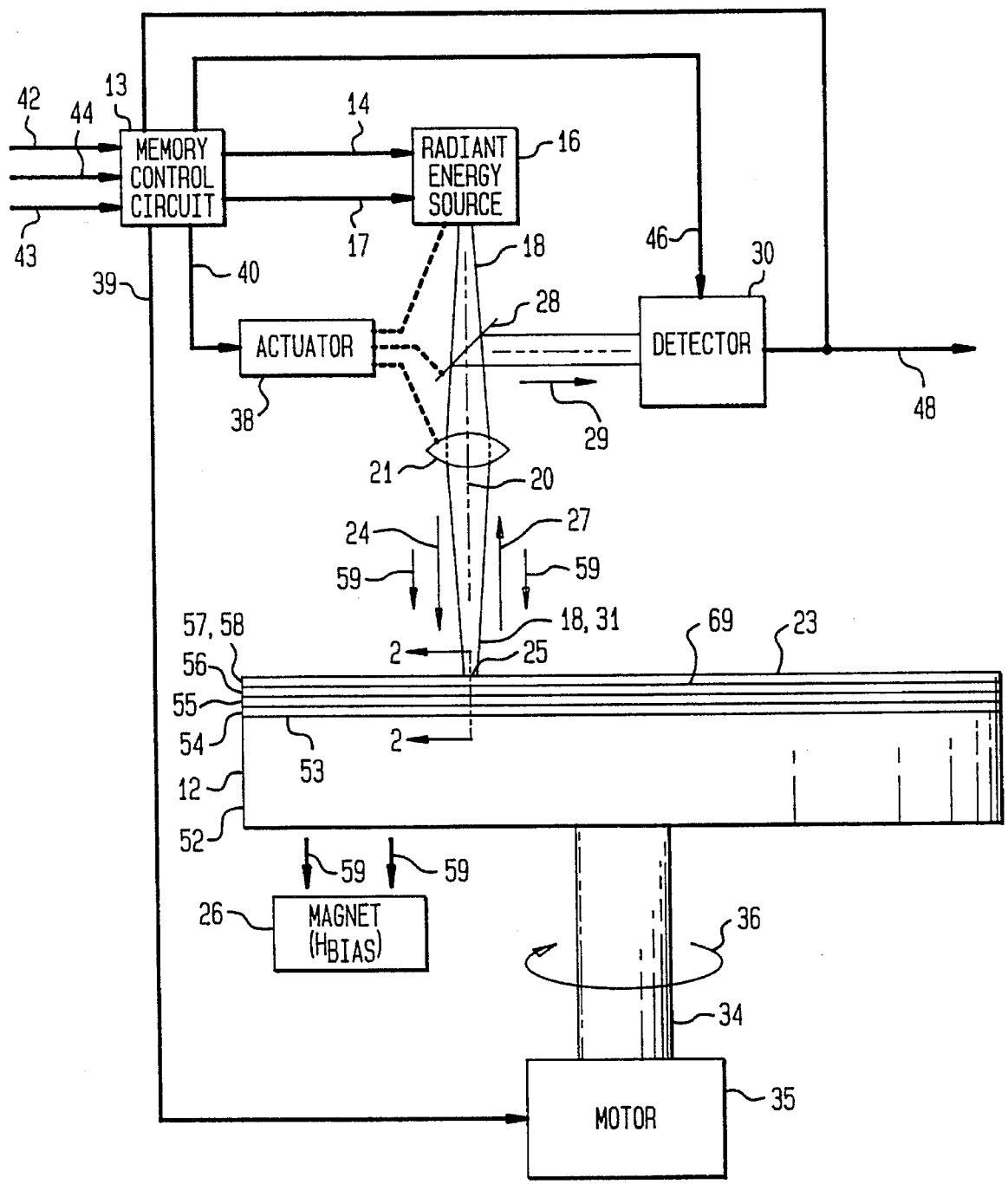
FIG. 1 is one embodiment of the invention.

Referring now to the drawing, FIG. 1 shows magneto-optic memory 10 for writing and reading data stored in disk 12. Memory control circuit 13 functions to generate a control signal over lead 14 to a control input of radiant energy source 16. Memory control circuit 13 also provides an intensity signal over lead 17 to radiant energy source 16. The signals on leads 14 and 17 to radiant energy source 16 functions to control the duration and intensity of radiant energy beam 18 emanating from radiant energy source 16. Radiant energy beam 18 has a longitudinal optic axis 20 which passes through lens 21. Radiant energy beam 18 may pass through transmissive mirror 28. Lens 21 functions to focus radiant energy beam 18 onto surface 69 of layer 56 of disk 12. Arrow 24 shows radiant energy beam 18 moving towards surface 69. Layer 57 functions as an antireflection coating. Radiant energy beam 18 impinges on a selected area 25 of surface 69 of layer 56. Radiant energy beam 18 functions to raise the temperature of surface 69 of layer 56 at a selected area 25 to a first temperature at first times and to a second temperature at a second times depending upon whether a "1" or a "0" is to be written.

A magnet 26 may be positioned below disk 12 as shown in FIG. 1 to provide an additional applied field $H_{BIAS}$ to magneto-optic storage medium 58 as shown by arrows 59. Magnet 26 may be supported by a fixture (not shown) stationary with respect to ground or may be part of disk 12. Magnet 26 may be positioned above disk 12 and may be a permanent magnet or an electrical coil. The applied field $H_{BIAS}$ shown by arrows 59 is substantially constant.

During read operation, radiant energy beam 18 is reflected from surface 69 of layer 56 of disk 12 in the direction shown by arrow 27 back through lens 21 whereupon it is reflected by a transmissive mirror 28 to detector 30. Detector 30 functions to measure the rotation of reflected beam 31 being reflected from surface 69 of layer 56 due to the Kerr effect. If radiant energy beam 18 passes through surface 69, layer 56 and other layers and disk 12 to detector 30 positioned below disk 12 or via mirrors not shown, then detector 30 functions to measure the rotation of radiant energy beam 18 due to the Faraday effect. If the radiant energy beam 18 passes through surface 69, layer 56 and possibly other layers and then is reflected back through layer 56 to detector 30, then detector 30 functions to measure the double rotation of radiant energy beam 18 due to a double Faraday effect which is known by persons skilled in the art.

Disk 12 may be positioned with respect to radiant energy beam 18 by rotation of disk 12 by way of spindle 34 and motor 35. Disk 12 may rotate clockwise as viewed from above as shown by arrow 36. An actuator 38 may move radiant energy source 16, mirror 28 and lens 21 with respect to disk 12 such as in a radial direction. Memory control circuit 13 provides an on and off control signal over lead 39 to motor 35. Memory control circuit 13 provides a position signal over lead 40 to actuator 38.

Memory control circuit 13 receives a write signal on lead 42 a read signal on lead 43 and a data signal on lead 44 for data to be written onto disk 12. Memory control circuit 13 provides a control signal over lead 46 to a control output of detector 30. Detector 30 has an output signal indicative of the data detected over lead 48.

Disk 12 may be a floppy disk or a hard disk. Disk 12 may comprise a substrate 52 having an upper surface 53. Layers 54 through 56 form magneto-optic storage media 58. Layer 54 of magnetic material may be formed on surface 53. Layer 55 of magnetic material may be formed over layer 54. Layer 56 of magnetic material may be formed over layer 55. Layer 57 of optically transparent material may be formed over layer 56. Layer 57 functions to provide an anti-reflection coating with respect to the wavelength of radiant energy beam 18.

Figure 2:
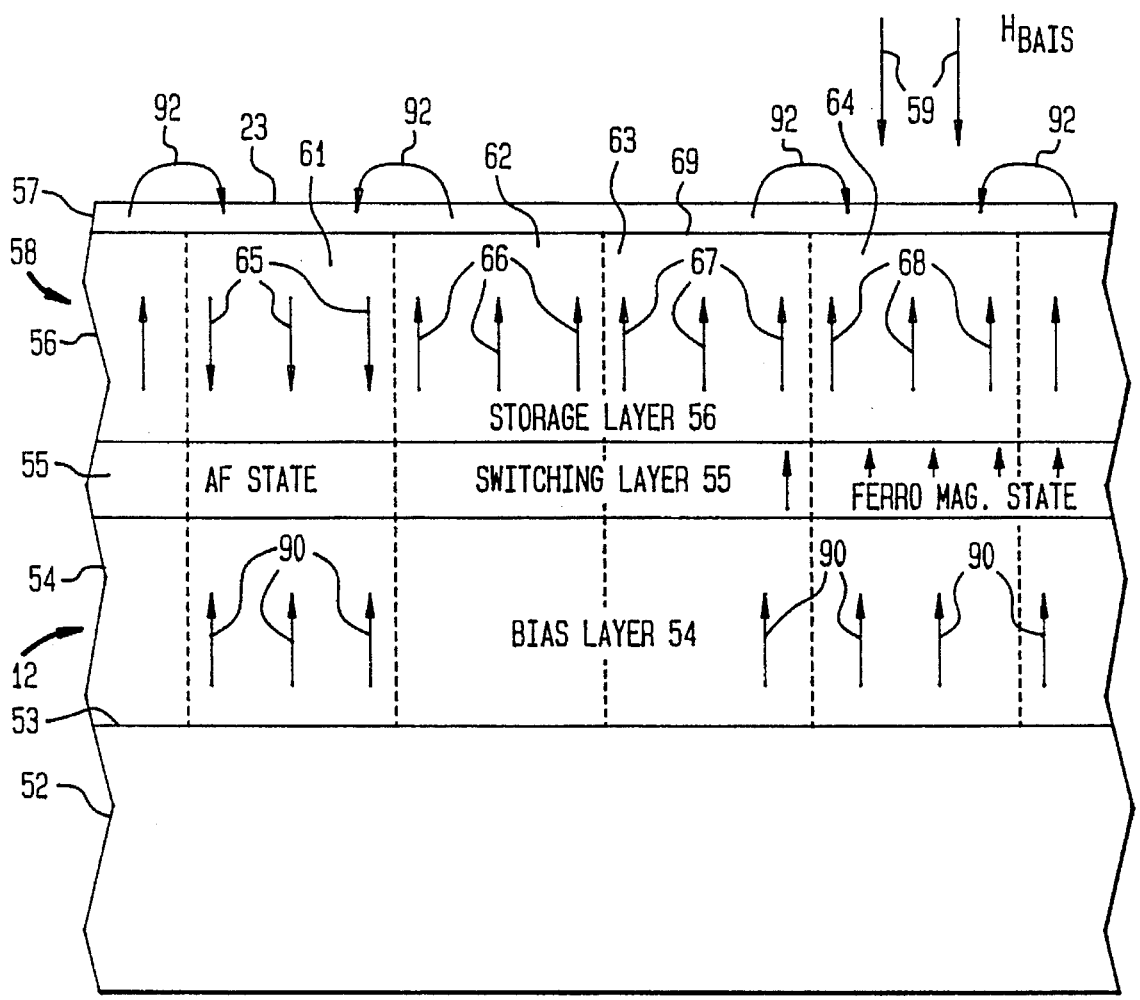
FIG. 2 is an enlarged cross-section view of the media along lines 2—2.

FIG. 2 shows an enlarged cross-section view of FIG. 1 along the line 2—2 showing in more detail the magnetic domains and magnetic direction for the storage of data in magneto-optic storage media 58. Storage layer 56 functions to store the data by the direction of magnetization which is generally up or down transverse to storage layer 56. Bias layer 54 and switching layer 55 function to write data in storage layer 56 with the aid of radiant energy beam 18 which raises the temperature of layers 54 through 56. Layer 56 may have a plurality of magnetic domains 61 through 64 for storing respective data bits representative of "1" or "0" depending upon whether the magnetization shown by arrows 65 through 68 are in the upward or downward direction with respect to upper surface 69 of layer 56. Storage layer 56 is composed of a square magnetization loop magneto-optic storage material such as amorphous TbFeCo which is currently used in magneto-optic storage disks presently available.

A measure of the squareness of square magnetization loop material is given by equation 1.

$$S = m_R/M_S \quad (1)$$

where $M_R$ is the remanent magnetization and $M_S$ is the saturation magnetization. The magnetization loop or curve of a material may be plotted on a graph. With the ordinate being magnetization and the abscissa being the applied field H. With an increase of the applied field H, the magnetization increases. Upon decrease of the applied field H, the magnetization decreases slightly for square loop material. $M_S$ is the last common point or overlapping point on the curve for decreasing applied field H with respect to and after the applied field H had been increasing. $M_R$ is the point on the curve where the applied field H is zero after the applied field H has been decreased.

The value S from Equation 1 is a measure of the squareness of the magnetization loop. When S is 0.8 or greater, the magnetization loop for a given material is considered square. The value S may approach the value 1.

Layer 54 functions to provide a magnetization bias through switching layer 55 to storage layer 56. Layer 54 is composed of a material having a high coercivity square loop material such as used to form permanent magnets. Layer 54 functions to provide an exchange bias field, $H_{EXCH}$ which can act on storage layer 56. A switching layer 55 is positioned between layers 54 and 56 and is composed of a material which is an antiferromagnet below some critical temperature, $T_{AF}$ and a ferromagnet above $T_{AF}$. An example of a material suitable for switching layer 55 is FeRh with the ordered CsCl crystal structure. When switching layer 55 is in the ferromagnetic state, switching layer 55 provides exchange coupling between the bias layer 54 and the storage layer 56.

Figure 3:
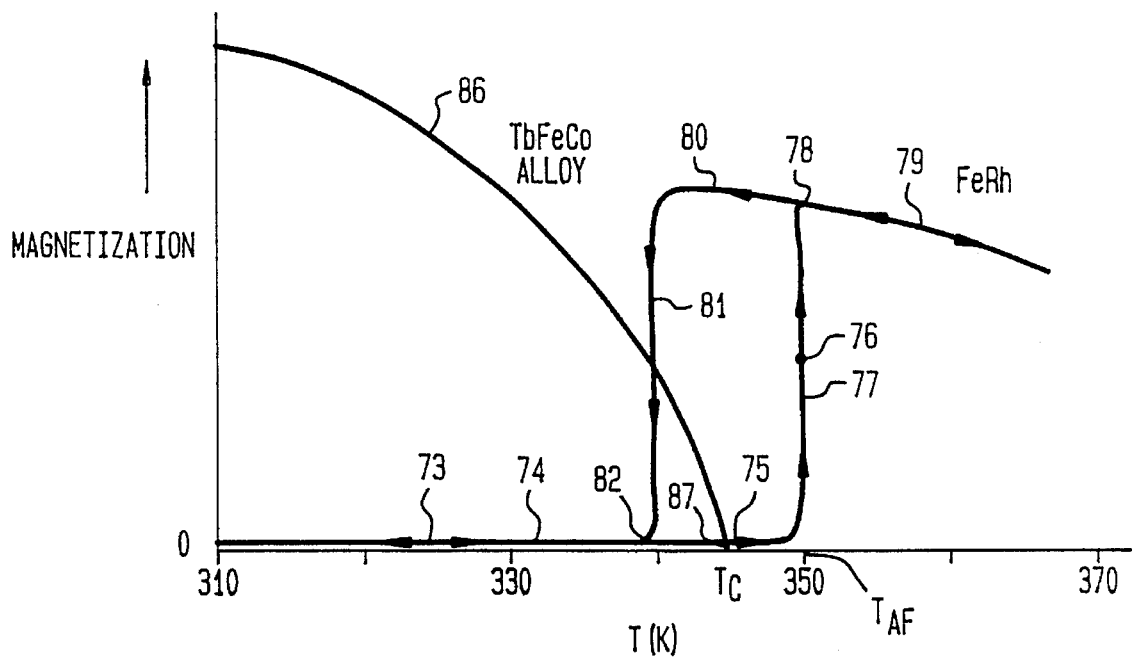
FIG. 3 is a graph showing an example of the magnetization versus temperature of the storage layer and the switching layer shown in FIG. 2.

FIG. 3 is a graph showing an example of the magnetization versus temperature of FeRh which may be used as the switching layer shown in FIG. 2. FIG. 3 also shows a curve of the magnetization versus temperature of TbFeCo for use as storage layer 56 which is shown in FIG. 2. In FIG. 3 the ordinate represents magnetization and the abscissa represents temperature in degrees kelvin. In FIG. 3 curve 73 shows the magnetization of FeRh with respect to temperature. As shown in FIG. 3, at temperatures below about 340 degrees kelvin, iron rhodium has a very low magnetization as shown by curve portion 74 corresponding to the antiferromagnetic state. As the temperature of iron rhodium increases above 340 degrees kelvin, it remains in the antiferromagnetic state as shown by curve portion 75 until reaching a temperature of about 350 degrees kelvin whereupon the magnetization increases as shown by curve portion 77 and to a high magnetization shown by point 78 on curve 77 which corresponds to the ferromagnetic state. As the temperature iron rhodium increases beyond the temperature shown at point 78, the magnetization remains relatively high but decreases in magnitude as shown by curve portion 79. As the temperature of iron rhodium is decreased when in the ferromagnetic state, iron rhodium retraces curve portion 79 and continues in a ferromagnetic state beyond point 78 as shown by curve portion 80. At a temperature of about 340 degrees kelvin, as shown by curve portion 81, the high magnetization dramatically decreases to low magnetization such as shown at point 82 which corresponds to the antiferromagnetic state. Further decreases in the temperature of iron rhodium below the temperature at point 82 causes little change in the value of low magnetization of iron rhodium which remains at or close to zero as shown by curve portion 74. As shown by curve 73 in FIG. 3, iron rhodium has a thermal hysteresis with respect to magnetization of about 10 degrees kelvin. More generally, iron rhodium or layers of iron rhodium may have a thermal hysteresis in the range from 10 to 20 degrees kelvin which is typical for bulk samples such as described by S. A. Nikitin et al., "The Magnetocaloric effect in $Fe_{49}Rh_{51}$ compound", Physics Letters A, 148, 363 (1990) and in a paper by K. B. Vlasov et al., "Giant magnetic aftereffect of thermal expansion near a first-order magnetic phase transition in alloys based on $Fe_{0.49}Rh_{0.51}$", Soy. Phys Solid State, 31 300 (1989).

In FIG. 3, curve 86 shows the magnetization versus temperature of amorphous TbFeCo alloy which may be used for storage layer 56. As the temperature of TbFeCo alloy is increased, the magnetization decreases and reaches zero at about 343 degrees Kelvin as shown by point 87 on curve 86. As shown in FIG. 3 the Curie temperature of TbFeCo is about 5 degrees Kelvin less than the transition temperature, $T_{AF}$, of iron-rhodium which is measured midway on the magnetization versus temperature curve when iron-rhodium passes from the antiferromagnetic state to the ferromagnetic state. FIG. 3 shows $T_{AF}$ measured at point 76 on curve portion 77.

Referring to FIG. 2, a radiant energy beam 18 may impinge upon magnetic domain 64 causing a selected area 25 corresponding to magnetic domain 64 to be heated to a pre-determined temperature depending upon the intensity of radiant energy beam 18 and the pulse duration or modulation of radiant energy beam 18. Radiant energy beam 18 must raise the temperature of layers 56 and 55 to a pre-determined temperature. While the temperature of layer 54 may be raised, the magnetization of layer 54 as shown by arrows 90 is unaffected or unchanged. For writing or overwriting a "1" in layer 56, the temperature of layer 56 should exceed the Curie $T_c$ and the temperature of layer 55 should exceed the transition temperature $T_{AF}$ which results in the magnetization from bias layer 54 being coupled through layer 55 to layer 56 resulting in a up domain in layer 56. The exchange field of the bias layer 54 acts on the storage layer 56 through the ferromagnetic iron-rhodium switching layer 55; this exchange field remains during the initial cooling of storage layer 56 through its Curie temperature $T_c$ because of the thermal hysteresis of the iron-rhodium as shown in FIG. 3 which keeps switching layer 55 in the ferromagnetic state below $T_{AF}$ as shown by curve portion 80.

For writing a "0" in magnetic domain 61, radiant energy beam 18 raises the temperature of layer 56 above $T_c$ but does not raise the temperature of layer 55 above $T_{AF}$. The iron-rhodium in layer 55 remains in the antiferromagnetic state and a down magnetization in domain 61 will be written because cooling of layer 56 through $T_c$ occurs only in the absence of the exchange field since layer 55 is in the antiferromagnetic state as shown by curve portion 75. Magnetic domain 61 is written in the down state due to the demagnetization field $H_{demag}$ of layer 56 which closes through magnetic domain 61 of storage layer 56 when layer 56 is heated above its $T_c$ while layer 55 remains below $T_{AF}$.

As shown in FIG. 2, the magnetic field acting on the heated region below selected area 25 is $H_{Exch}$, $H_{BIAS}$, applied field, and $H_{Demag}$. The demagnetization field is shown by arrows 92 exiting surface 69 of storage layer 56 and reentering surface 69 of storage layer 56.

In operation, magneto-optic storage medium 58 must be initialized in a manner which leaves bias layer 54 in a uniform remanent state, for example, with the magnetization in the up direction as shown by arrows 90. In this case, a fixed external bias field is provided in the down direction in the disk drive. The initialization can be done by applying a magnetic field greater than the field of the bias layer. Initialization of magneto-optic storage medium 58 could also be done thermomagnetically, track by track, by heating close to the Curie temperature of bias layer 54 and cooling in a more modest or lesser magnetic field in the up direction such as shown by arrows 90.

Figure 4:
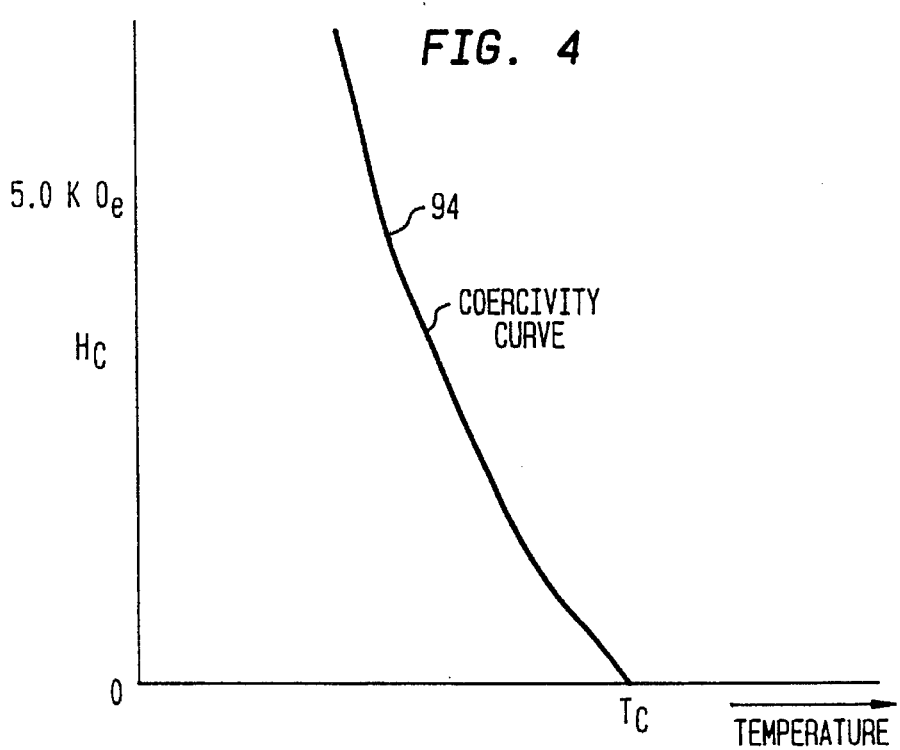
FIG. 4 is a graph showing the coercivity versus temperature of the storage layer.

FIG. 4 is a graph showing the coercivity versus temperature of storage layer 56 which may be, for example, TbFeCo alloy. In FIG. 4 the ordinate represents coercivity $H_c$ and the abscissa represents temperature. Curve 94 shows the coercivity versus temperature. When the coercivity is zero, the temperature is at the Curie temperature.

Figure 5:
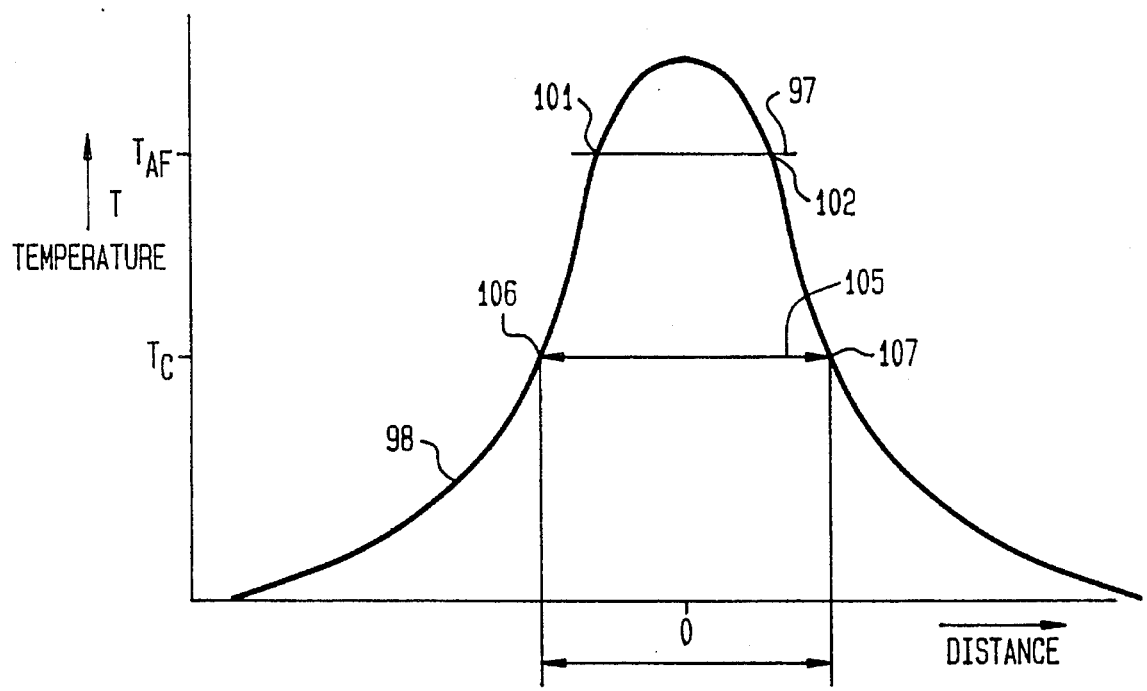
FIGS. 5 and 6 are graphs showing examples of the temperature profile across a selected area of the storage layer in response to receiving an incident radiant energy beam.

FIG. 5 is a graph showing an example of the temperature profile across a selected area of storage layer 56 receiving incident radiant energy beam 18. In FIG. 5 the ordinant represents temperature and the abscissa represents distance along surface 69 of storage layer 56. Radiant energy beam 18 operating at a selected wavelength such as 800 nanometers may be working at the diffraction element as defined by λ/numerical aperture (N.A.) where the numerical aperture is defined by the diameter of the beam/focal length. As shown in FIG. 5 distance "0" corresponds to the optic axis 20 of radiant energy beam 18. The temperature on surface 69 at distance 0 is the maximum which for writing a "1" should exceed temperature $T_{AF}$ designated by reference line 97. Curve 98 shows the temperature profile with respect to distance on surface 69. Points 101 and 102 where reference line 97 intersects curve 98 shows the width of the selected area that has a temperature which exceeds $T_{AF}$. Reference line 105 corresponds to the Curie temperature of storage layer 56. Points 106 and 107 where reference line 105 intersects with curve 98 corresponds to the width of selected area 25 which is raised at least to the Curie temperature $T_c$. The width of a magnetic domain such as magnetic domain 64 shown in FIG. 2 will certainly have a minimum width showing by the distance between points 101 and 102 and a maximum width shown by the distance between points 106 and 107 at times a "1" is written into magnetic domain 64.

Figure 6:
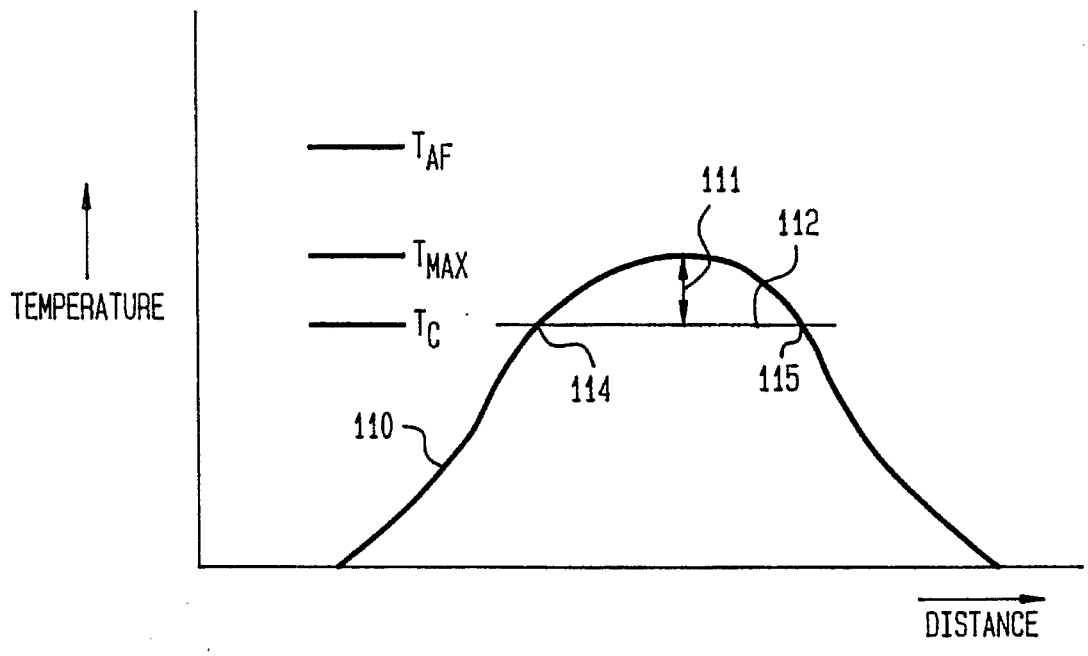

FIG. 6 is a graph showing an example of the temperature profile across surface 69 of storage layer 56 due to an incident radiate energy 18 at times a "0" is to be written into a magnetic domain such as magnetic domain 61. In FIG. 6 the ordinate represents temperature and the abscissa represents distance. Distance 0 corresponds to the optic axis 20 of radiant energy beam 18 impinging on surface 69. Curve 110 shows the temperature of surface 69 as a function of distance on surface 69. The maximum temperature at point 111 of surface 69 at distance 0 is less than $T_{AF}$ and greater than $T_c$. Reference line 112 correspond to the Curie $T_c$ which intersects curve 110 at points 114 and 115. The width of magnetic domain 61 which is written to a "0" will correspond to the distance between point 114 and 115. Radiant energy beam 18 is assumed to be substantially symmetric about optic axis 20. FIGS. 5 and 6 therefore corresponds to a surface temperature substantially symmetric in all directions from distance 0.

The invention as described utilizes a switching layer (55) in cooperation with a radiant energy beam (18) to directly write or overwrite ones and zeros in storage layer 56 at typical recording speeds.

In a further improvement of the invention, an antireflection coating shown by layer 57 in FIG. 2 may cover storage layer 56 for coupling power from radiant energy beam 18 to layers 54 through 56 during write operation and to get a larger magneto-optic Kerr rotation in reflective beam 31.

While FIG. 2 shows layers 54, 55 and 56 stacked with layer 56 on top, layers 54 through 56 may be reversed in order thereby placing layer 54 on top in place of layer 56 shown in FIG. 2 and layer 56 in place of layer 54 shown in FIG. 2.

While there have been described and illustrated a magneto-optic memory 10 and a magneto-optic storage medium 58, it will be apparent to those skilled in the art that modifications and variations are possible without deviating from the broad scope of the invention which shall be limited solely by the scope of the claims appended hereto.

Having thus described our invention, what we claim as new and desire to secure by Letters Patent is:

1. A magneto-optic storage media comprising:
   a bias layer of first magnetic material having high coercivity and a square magnetization loop characteristic to provide an exchange bias field to act at first times on a storage layer,
   a switching layer of second magnetic material having an antiferromagnetic state below a critical temperature $T_{AF}$ and a ferromagnetic state above $T_{AF}$ to provide exchange coupling between said bias layer and said storage layer, said second magnetic material having a thermal hysteresis between said antiferromagnetic state and said ferromagnetic state, and
   a storage layer of third magnetic material having a square loop magneto-optic characteristic and a Curie temperature less than $T_{AF}$.

2. The magneto-optic media of claim 1 wherein said first magnetic material is a permanent magnet.

3. The magneto-optic media of claim 1 wherein said second magnetic material is FeRh.

4. The magneto-optic media of claim 1 wherein said third magnetic material is amorphous TbFeCo.

5. The magneto-optic media of claim 1 wherein said third magnetic material has a Curie temperature in the range from 20° C. below $T_{AF}$ to 0.5° C. below $T_{AF}$.

6. The magneto-optic media of claim 1 wherein said second magnetic material has a thermal hysteresis in the range from 10° to 20° C.

7. A magneto-optic memory for writing data comprising:
   a radiant energy source for generating radiant energy, means for focussing said radiant energy on a selected area of a magneto-optic media, said magneto-optic media comprising:
   a bias layer of first magnetic material having high coercivity and a square magnetization loop characteristic to provide an exchange bias field to act at first times on a storage layer,
   a switching layer of second magnetic material having a antiferromagnetic state below a critical temperature $T_{AF}$ and ferromagnetic state above $T_{AF}$ to provide exchange coupling between said bias layer and said storage layer, said second magnetic material having a thermal hysteresis between said antiferromagnetic state and said ferromagnetic state,
   a storage layer of third magnetic material having a square loop magneto-optic characteristic and a Curie temperature less than $T_{AF}$, and
   means for adjusting the energy delivered by said radiant energy source to raise the temperature of said selected area of said magneto-optic media to a first temperature at first times whereby said storage layer is magnetized in an up direction transverse to the surface of said storage layer and to a second temperature at second times whereby said storage layer is magnetized in a down direction transverse to the surface of said storage layer.

8. The magneto-optic memory of claim 7 wherein said means for adjusting the energy includes means for raising the temperature of said selected area of said magneto-optic media to a first temperature where said first temperature is greater than said $T_c$ of said third storage layer and less than said $T_{AF}$ of said second switching layer.

9. The magneto-optic memory of claim 7 wherein said means for adjusting the energy includes means for raising the temperature of said selected area of said magneto-optic media to a second temperature where said second temperature is greater than said $T_{AF}$ of said second switching layer.

10. A method for writing data into magneto-optic media comprising the steps of:
   generating radiant energy,
   focussing said radiant energy on a selected area of a magneto-optic media, said magneto-optic media comprising:
   a first bias layer of first magnetic material having high coercivity and a square magnetization loop characteristic to provide an exchange bias field to act at first times on a storage layer,
   a second switching layer of second magnetic material having a antiferromagnetic state below a critical temperature $T_{AF}$ and ferromagnetic state above $T_{AF}$ to provide exchange coupling between said bias layer and said storage layer, said second magnetic material having a thermal hysteresis between said antiferromagnetic state and said ferromagnetic state, and
   a third storage layer of third magnetic material having a square loop magneto-optic characteristic and a Curie temperature less than $T_{AF}$, and
   adjusting the energy delivered by said radiant energy source to raise the temperature of said selected area of said magneto-optic media to a first temperature at first times whereby said storage layer is magnetized in an up direction transverse to the surface of said storage layer and to a second temperature at second times whereby said storage layer is magnetized in a down direction transverse to the surface of said storage layer.

11. The method of claim 10 wherein said step of adjusting the energy includes the step of raising the temperature of said selected area of said magneto-optic media to a first temperature where said first temperature is greater than said $T_c$ of said third storage layer and less than said $T_{AF}$ of said second switching layer.

12. The method of claim 7 wherein said step of adjusting the energy includes the step of raising the temperature of said selected area of said magneto-optic media to a second temperature where said second temperature is greater than said $T_{AF}$ of said second switching layer.

* * * * *